United States Patent
Macleod et al.

(10) Patent No.: US 11,435,254 B2
(45) Date of Patent: Sep. 6, 2022

(54) LEAK DETECTOR

(71) Applicant: GLOBAL LEAK TECHNOLOGIES LTD, Edinburgh Lothian (GB)

(72) Inventors: Graeme Macleod, Edinburgh (GB); James McGiffen, Edinburgh (GB)

(73) Assignee: GLOBAL LEAK TECHNOLOGIES LTD, Edinburgh (GB)

( * ) Notice: Subject to any disclaimer, the term of this patent is extended or adjusted under 35 U.S.C. 154(b) by 0 days.

(21) Appl. No.: 16/757,762

(22) PCT Filed: Oct. 25, 2018

(86) PCT No.: PCT/GB2018/053100
§ 371 (c)(1),
(2) Date: Apr. 20, 2020

(87) PCT Pub. No.: WO2019/081941
PCT Pub. Date: May 2, 2019

(65) Prior Publication Data
US 2021/0190626 A1    Jun. 24, 2021

(30) Foreign Application Priority Data
Oct. 25, 2017  (GB) ..................................... 1717570

(51) Int. Cl.
*G01M 3/18* (2006.01)
*G01M 3/16* (2006.01)

(52) U.S. Cl.
CPC .............. *G01M 3/18* (2013.01); *G01M 3/165* (2013.01)

(58) Field of Classification Search
CPC .......... G01M 3/04; G01M 3/16; G01M 3/165; G01M 3/18
See application file for complete search history.

(56) References Cited

U.S. PATENT DOCUMENTS 4,640,276 A    2/1987 Jing-Sheng
5,440,917 A    8/1995 Smith et al.
(Continued)

FOREIGN PATENT DOCUMENTS

CN    201164616    12/2008
EP    0580903    2/1994
(Continued)

OTHER PUBLICATIONS

International Search Report for International Application No. PCT/GB2018/053100.

*Primary Examiner* — Erika J. Villaluna
(74) *Attorney, Agent, or Firm* — Liu & Liu

(57) ABSTRACT

The invention relates to a leak detector (10) for detecting leaked liquid. The leak detector (10) comprises a flexible and elongate fastener (12) configured to fit around a liquid containing pipe to thereby attach the leak detector to the liquid containing pipe. The leak detector also comprises a leak sensor and a housing (14) containing electrical circuitry. The leak sensor (is) comprised in at least one of the fastener and the housing. The leak sensor is configured to sense liquid leaking from the liquid containing pipe with the electrical circuitry being operative to detect a leak in dependence on an output from the leak sensor. The leak detector is configured such that the housing (14) and the fastener (12) are abreast.

12 Claims, 3 Drawing Sheets

(56) References Cited

U.S. PATENT DOCUMENTS

| | | | |
|---|---|---|---|
| 5,557,263 | A | 9/1996 | Fisher et al. |
| 5,760,694 | A | 6/1998 | Nissim et al. |
| 6,175,310 | B1 | 1/2001 | Gott |
| 6,246,330 | B1 | 6/2001 | Nielsen |
| 6,292,102 | B1 | 9/2001 | Smith |
| 6,639,517 | B1 | 10/2003 | Chapman et al. |
| 7,147,615 | B2 * | 12/2006 | Wariar .................. A61M 5/158 604/6.16 |
| 7,605,710 | B2 * | 10/2009 | Crnkovich .............. A61F 13/42 340/603 |
| 9,245,438 | B2 * | 1/2016 | Burtner ................. G01F 23/242 |
| 2002/0070868 | A1 | 6/2002 | Jeutter et al. |
| 2008/0038588 | A1 | 2/2008 | Lee |
| 2011/0214490 | A1 | 9/2011 | Sakita |
| 2011/0271424 | A1 | 11/2011 | Revol Cavalier |
| 2016/0166438 | A1 * | 6/2016 | Rovaniemi ....... A61F 13/00059 600/301 |
| 2016/0371957 | A1 * | 12/2016 | Ghaffari ................. G01M 7/08 |
| 2017/0003192 | A1 * | 1/2017 | Ling ..................... G01M 3/165 |

FOREIGN PATENT DOCUMENTS

| | | |
|---|---|---|
| FR | 2226071 | 11/1974 |
| FR | 2922016 | 4/2009 |
| GB | 2272093 | 5/1994 |
| GB | 2321990 | 8/1998 |
| GB | 2348032 | 9/2000 |
| GB | 2377995 | 1/2003 |
| JP | S62285053 | 12/1987 |
| JP | H116781 | 1/1999 |
| JP | 2010014481 | 1/2010 |
| KR | 20110035232 | 4/2011 |
| NZ | 544524 | 2/2008 |
| WO | 2009075592 | 6/2009 |
| WO | 2013164558 | 11/2013 |
| WO | 2017105779 | 6/2017 |

* cited by examiner

LEAK DETECTOR

FIELD OF THE INVENTION

The present invention relates to leak detectors configured to detect leaked liquid and in particular but not exclusively to detect leaked water.

BACKGROUND ART

Appliances such as washing machines, dishwashers and heating boilers which draw from a supply of water may leak water as may water pipes which lead to or from such appliances or indeed water pipes in general. A water leak from such an appliance or from a water pipe may cause significant inconvenience and damage to the property in which the water is leaking and also to neighbouring properties. Early detection of a water leak may enable action of lesser inconvenience to be taken to forestall water damage or to at least minimise water damage.

GB 2503205 A discloses a leak detector comprising a housing which contains detection circuitry and which is mounted on and half way along an elongate, flexible fastener which contains a leak sensor. The leak detector is brought into use by wrapping the fastener around a water pipe at a location at which a leak is liable to occur or where water from a leak is likely to be present. The leak sensor is thus brought into sufficient proximity to the water pipe such that leaked water on the exterior of the water pipe is sensed by the leak sensor. The leak detector of GB 2503205 A may also be used to sense water present on other surfaces by laying the leak detector on a surface such that the fastener lies flat on the surface. In such use, the fastener does not serve to attach the leak detector but still serves to sense water present on the surface on which the leak detector is laid by way of the leak sensor contained in the fastener. For example the leak detector might be laid on the floor underneath a central heating boiler.

The present inventors have appreciated the leak detector of GB 2503205 A to have shortcomings under certain circumstances. The present invention has been devised in the light of the inventors' appreciation of such shortcomings. It is therefore an object for the present invention to provide an improved leak detector.

STATEMENT OF INVENTION

According to a first aspect of the present invention there is provided a leak detector for detecting leaked liquid, the leak detector comprising:
- a flexible and elongate fastener configured to fit around a liquid containing pipe to thereby attach the leak detector to the liquid containing pipe;
- a housing containing electrical circuitry; and
- a leak sensor comprised in at least one of the fastener and the housing, the leak sensor being configured to sense liquid leaking from the liquid containing pipe, the electrical circuitry being operative to detect a leak in dependence on an output from the leak sensor,
- the housing and the fastener being abreast.

The leak detector according to the invention is for detecting leaked liquid such as leaked water. The leak detector comprises a flexible and elongate fastener which is configured to fit around a liquid containing pipe, such as a water pipe, to thereby attach the leak detector to the liquid containing pipe. The leak detector further comprises a housing which contains electrical circuitry. A leak sensor is comprised in at least one of the fastener and the housing. The leak sensor is configured to sense liquid leaking from the liquid containing pipe. The electrical circuitry is operative to detect a leak in dependence on an output from the leak sensor. The leak detector is configured such that the housing and the fastener are abreast. More specifically, the leak detector may be configured such that the housing and the fastener are side by side in a longitudinal direction of the fastener. An end of the fastener may therefore abut against a side of the housing. Where the fastener comprises two fastener parts, an end of a first fastener part may abut against a first side of the housing and an end of a second fastener part may abut against a second, opposite side of the housing. The abreast disposition of the housing and the fastener may reduce a height of the leak detector, i.e. in a direction orthogonal to each of a length and width of the fastener, whereby the leak detector may be more readily received in and laid flat within a space of restricted size, such as where there is limited headroom, when not attached to a liquid containing pipe. There may, for example, be limited headroom underneath an appliance, such as underneath a washing machine or dishwasher. The leak detector of GB 2503205 A is configured such that the housing is mounted on the fastener such that the height of the leak detector of GB 2503205 A precludes its reception in spaces of restricted size.

The leak detector may have a unitary structure. As described further below, at least one part of the housing and a part of the fastener may be integrally formed with each other.

The housing may comprise an upper housing part and the fastener may comprise an upper fastener part. The leak detector may be configured such that the upper housing part and the upper fastener part are oriented away from a liquid containing pipe when the leak detector is attached to the liquid containing pipe by way of the fastener. The upper housing part may be integrally formed with the upper fastener part, such as by moulding or casting. The upper housing part and the upper fastener part may be constituted by the same component and more specifically by an upper leak detector part.

The housing may comprise a lower housing part and the fastener may comprise a lower fastener part. The leak detector may be configured such that the lower housing part and the lower fastener part are oriented towards a liquid containing pipe when the leak detector is attached to the liquid containing pipe by way of the fastener. The lower housing part may be integrally formed with the lower fastener part. The lower housing part and the lower fastener part may be constituted by the same component and more specifically by a lower leak detector part. The lower fastener part may define a plurality of apertures spaced along the lower fastener part. The plurality of apertures may provide for admission of leaked water to the leak sensor.

An exterior surface of the leak detector may be defined and more specifically may be substantially entirely defined by the upper leak detector part and the lower leak detector part.

The housing may be at one end of the fastener. Hence the fastening fastener may extend from one side only of two opposite sides of the housing.

The leak sensor may comprise a liquid sensor, the electrical circuitry being operative to detect a leak in dependence on liquid sensed by the liquid sensor. The liquid sensor may be configured to sense liquid when liquid is in contact with a sensing part of the liquid sensor. The leak detector and more specifically the fastener may be configured such that liquid present on a surface over which the leak detector is disposed comes into contact with the sensing part. The sensing part of the liquid sensor may be supported within the fastener. At least one of the housing and the fastener may be configured to admit liquid to the sensing part within the fastener. A part of at least one of the housing and the fastener may be permeable to liquid. At least one of the lower housing part and the lower fastener part may define apertures and more specifically pores for the passage of liquid therethrough. At least one of the lower housing part and the lower fastener part may have a mesh structure.

The leak detector may comprise a liquid absorbing arrangement, such as an absorbent pad, which is configured to absorb leaked liquid. The liquid absorbing arrangement may be supported by at least one of the housing and the fastener. More specifically the liquid absorbing arrangement may be contained by at least one of the housing and the fastener. The liquid absorbing arrangement may be disposed relative to the sensing part whereby the sensing part is operative in dependence on liquid retained by the liquid absorbing arrangement. The liquid absorbing arrangement may therefore be in contact with the sensing part. In another form, the leak detector may lack a liquid absorbing arrangement. In this form, the sensing part may be disposed adjacent a lower surface of the leak detector whereby leaked water comes readily into contact with the sensing part whereby there is no need for the liquid absorbing arrangement. Where the sensing part comprises two spaced apart electrically conducting elements, the two spaced apart electrically conducting elements may extend adjacent a lower surface of the leak detector.

The sensing part of the liquid sensor may comprise two spaced apart electrically conducting elements. In the absence of leaked liquid there may be no electrical conduction between the two spaced apart electrically conducting elements. The two spaced apart electrically conducting elements may be disposed such that leaked liquid provides an electrical conduction path between the two spaced apart electrically conducting elements. The electrical circuitry may be configured to determine when there is electrical conduction between the two spaced apart electrically conducting elements. The electrical circuitry may comprise an electrical switch and more specifically a transistor switch which is closed when there is electrical conduction between the two spaced apart electrically conducting elements and is open when there is no electrical conduction between the two spaced apart electrically conducting elements. The electrical circuitry may be supported on a printed circuit board. The printed circuit board may be flexible whereby the leak detector may be more readily fitted around a liquid containing pipe and may fit more closely around the liquid containing pipe to thereby provide for more effective detection of leaked liquid. Alternatively or in addition, the housing may be flexible whereby the leak detector may be more readily fitted around a liquid containing pipe and may fit more closely around the liquid containing pipe to thereby provide for more effective detection of leaked liquid.

Each of the two spaced apart electrically conducting elements may extend alongside each other along the fastener. Each of the two spaced apart electrically conducting elements may follow a tortuous path along the fastener. Having the conducting elements follow a tortuous path may increase the likelihood of a conduction path being created between the conducting elements when the fastener makes partial contact with leaked liquid. Each of the two spaced apart electrically conducting elements may define a triangular path.

The electrical circuitry may be operative to generate a human perceptible signal in dependence on actuation of the leak sensor. The human perceptible signal may comprise at least one of a visible signal and an audible signal. The electrical circuitry may therefore comprise at least one of a light source, such as a Light Emitting Device (LED), and a loudspeaker. At least one of the light source and the loudspeaker may, for example, be actuated by the electrical switch.

In another embodiment, the fastener may be constituted by a flexible printed circuit board (PCB). Where the sensing part comprises two spaced apart electrically conducting elements, the two spaced apart electrically conducting elements may be comprised in the flexible PCB. The electrical circuitry may be supported on a PCB and more specifically on a flexible PCB which is integral with the flexible PCB which constitutes the fastener. The electrical circuitry and the fastener may be constituted by the same flexible PCB. The electrical circuitry may be encapsulated by a mass of material disposed over the PCB. The mass of material may be an epoxy, such as an epoxy of conventional form used in glob top encapsulation. The housing may thus be constituted by the PCB supporting the electrical circuitry and the mass of material disposed over the electrical circuitry. In one form, the flexible PCB may be configured such that the part of the flexible PCB supporting the electrical circuitry is in line with the part of the flexible PCB constituting the fastener. More specifically and where the fastener extends from one side only of the housing, an end of the part of the flexible PCB constituting the fastener may join a side of the part of the flexible PCB supporting the electrical circuitry. Alternatively and where the fastener is in two parts with each part extending from a respective side of the of the housing, an end of a first part of the flexible PCB constituting a first part of the fastener may join a first side of the part of the flexible PCB supporting the electrical circuitry and an end of a second part of the flexible PCB constituting a second part of the fastener may join a second, opposite side of the part of the flexible PCB supporting the electrical circuitry. In another form, the PCB supporting the electrical circuitry may be alongside the flexible PCB constituting the fastener. The PCB supporting the electrical circuitry may be attached to a side rather than an end of the flexible PCB constituting the fastener. More specifically, the flexible PCB supporting the electrical circuitry may be joined to the flexible PCB constituting the fastener by a bridging portion. The bridging portion may be constituted by flexible PCB.

Alternatively or in addition the electrical circuitry may be configured to transmit a leak detected signal to a remote location such as by way of a wireless communication channel. The electrical circuitry may therefore comprise a wireless transmitter and more specifically a wireless transceiver.

Wireless communication may, for example, be in accordance with a WiFi or Bluetooth standard. The leak detector may thus be able to convey the leak detected signal by way of the like of a Local Area Network (LAN) or Personal Area Network (PAN) and then perhaps in turn by way of a Wide Area Network (WAN) to a user who may not be in the vicinity of the leak detector but who is nevertheless alerted to the leak and who can then take appropriate action. Communication by way of a WAN may, for example, comprise sending of the like of an email or a Short Message Service (SMS) message. Where a plurality of leak detectors are in use in an area, the leak detectors may be in communication with each other whereby a signal, such as a leak detected signal, may be passed from leak detector to leak detector and then perhaps from one of the leak detectors to a remote location.

The leak detector may be of a size and weight that it is readily held in and moved by one hand. The leak detector may comprise an electric battery which may be supported in the housing whereby the leak detector may have no need for an external source of electrical power. Alternatively or in addition and where the leak detector comprises a wireless transceiver, the leak detector may comprise electrical circuitry which is configured to extract electrical power from a wireless signal received by the wireless transceiver.

The fastener may be configured to fasten to the liquid containing pipe when fitted around the liquid containing pipe. The leak detector may further comprise a retaining arrangement which is configured to hold spaced apart locations on the leak detector together. The retaining arrangement may comprise hook and loop fasteners. Alternatively or in addition the retaining arrangement may comprise a clasp. The leak detector may thus be held in place around a pipe.

According to a further aspect of the present invention there is provided a leak detector for detecting leaked fluid, the leak detector comprising: a fastener configured to be attached to a fluid containing pipe to thereby attach the leak detector to the fluid containing pipe; a housing containing electrical circuitry; and a leak sensor comprised in at least one of the fastener and the housing, the electrical circuitry being operative to detect a leak in dependence on an output from the leak sensor.

The fastener may be configured to fit around the fluid containing pipe. Alternatively or in addition, the leak detector may be configured such that the housing and the fastener are abreast.

Further embodiments of the further aspect of the present invention may comprise one or more features of the first aspect of the present invention.

BRIEF DESCRIPTION OF DRAWINGS

Further features and advantages of the present invention will become apparent from the following specific description, which is given by way of example only and with reference to the accompanying drawings, in which.

DESCRIPTION OF EMBODIMENTS

Figure 1A:
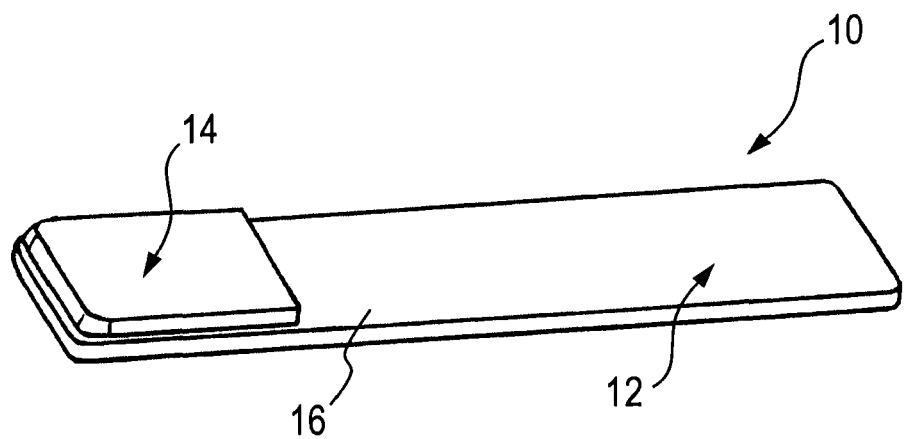
FIG. 1A is a perspective view of a leak detector according to a first embodiment.
Figure 1B:
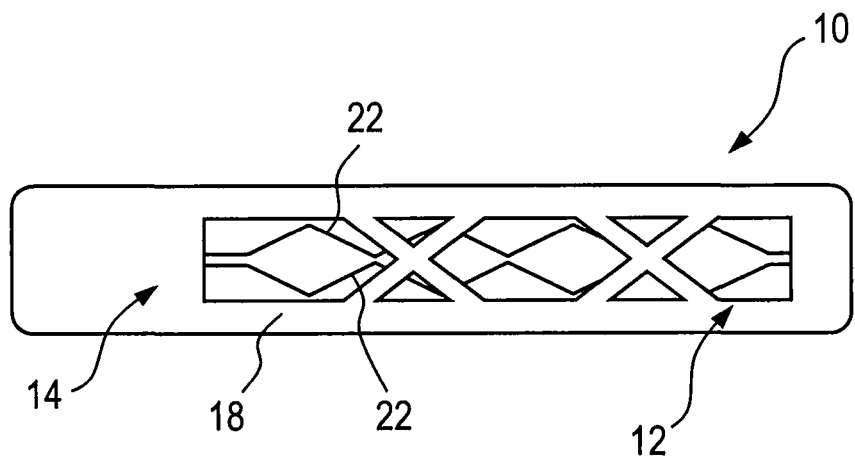
FIG. 1B is a view from below of the leak detector of FIG. 1A.

A perspective view of a leak detector 10 according to a first embodiment is shown in FIG. 1A. FIG. 1B provides an underside view of the leak detector 10 of FIG. 1A. The leak detector 10 comprises a flexible and elongate fastener 12 and a housing 14. The housing 14 is at one end of the elongate fastener 12 whereby the elongate fastener extends from one side only of the housing. As may be seen from FIG. 1A the fastener 12 and the housing 14 are in line with each other whereby the height of the leak detector is modest. The flexible and elongate nature of the fastener 12 enables it to be wrapped around a water pipe, such as a water pipe to or from a water drawing appliance. Although not shown in FIGS. 1A and 1B, the leak detector 10 comprises a retaining arrangement which is configured to hold the distal end of the fastener 12 and the distal end of the housing 14 together when the leak detector is fitted around a pipe. The retaining arrangement comprises hook and loop fasteners or a clasp. In an alternative application, the leak detector may be laid flat as shown in FIGS. 1A and 1B on a surface where leaked water is liable to accumulate. The modest height of the leak detector enables the leak detector to be received in a space of limited headroom such as underneath a washing machine or a dishwasher.

The leak detector 10 comprises an integrally formed upper leak detector part 16. The upper leak detector part 16 defines upper and side surfaces of the fastener 12 and the housing 14. The upper leak detector part 16 is formed from a flexible plastics material such as polyvinyl chloride (PVC). The housing is therefore also flexible. The leak detector 10 further comprises an integrally formed lower leak detector part 18. The lower leak detector part 18 defines a lower surface of the fastener 12 and the housing 14. The lower leak detector part 18 is bonded to the upper leak detector part 16 after the water sensor components are received in the space defined by the upper leak detector part 16. As may be seen from FIG. 1B, the lower leak detector part 18 defines apertures in the fastener part 12 of the leak detector 10 whereby leaked water is admitted inside the fastener part to thereby operate the water sensor. The water sensor is described below. The lower leak detector part 18 is formed from a flexible plastics material such as polyvinyl chloride (PVC).

The leak detector 10 further comprises a water sensor (which constitutes a liquid sensor) which in turn comprises two spaced apart electrically conducting elements which extend alongside each other along the fastener 12. The two spaced apart electrically conducting elements are supported inside the fastener 12 and such that they are exposed within the space defined within the fastener. Each of the two spaced apart electrically conducting elements follows a triangular path which is defined by a respective triangular profile 22 which extends along the fastener. Although not evident from FIGS. 1A and 1B, in a form the leak detector comprises an absorbent pad which is present in the space defined by the fastener 12 below and in contact with the two spaced apart electrically conducting elements. In use, the absorbent pad draws water from the underside of the leak detector and thus accumulates and retains leaked water. When damp, the absorbent pad provides for electrical conduction between the two spaced apart electrically conducting elements with which the absorbent pad is in physical contact.

The leak detector 10 yet further comprises electrical circuitry on a flexible printed circuit board (PCB) which is received in a space defined by the housing 14. As will be described further below the electrical circuitry is electrically coupled to the two spaced apart electrically conducting elements 22 and is configured to detect leaked water which forms an electrical path between the two spaced apart electrically conducting elements and to provide, amongst other things, an alarm in dependence on detection of leaked water.

In an unillustrated embodiment, instead of the open structure on the underside of the leak detector 10 of FIGS.

1A and 1B, the leak detector comprises a lower housing part in the form of a sheet of sprung steel having the form of a mesh. The lower housing part defines a lower surface of the fastener 12 and the housing 14. The lower housing part is attached to the upper housing part 16 of FIGS. 1A and 1B to thereby define a space therebetween in which the electrical circuitry, the two spaced apart electrically conducting elements and the absorbent pad, if present, are held. The mesh form of the lower housing part allows permeation of water from underneath the leak detector into the space defined therein where the water comes into contact with the two spaced apart electrically conducting elements.

Figure 2:
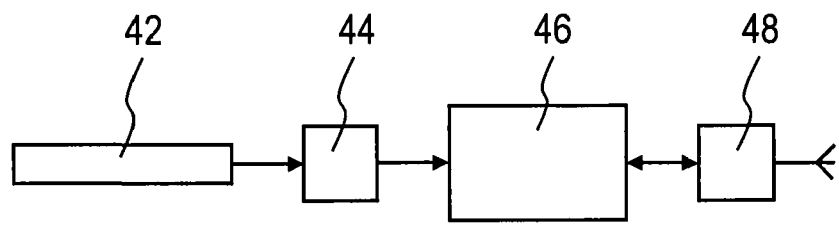
FIG. 2 is a block diagram representation of a leak sensor and electrical circuitry according to a first embodiment.

A block diagram representation of a leak sensor and electrical circuitry according to a first embodiment is shown in FIG. 2. The leak sensor and electrical circuitry comprise the two spaced apart electrically conducting elements 22, 42 described above and sensor interface circuitry 44. The sensor interface circuitry 44 is configured in accordance with standard design procedure familiar to the person of ordinary skill in the art to convert current passing between the two spaced apart electrically conducting elements to an analogue voltage level. The leak sensor and electrical circuitry further comprise a microprocessor 46 comprising an analogue-to-digital converter which receives the analogue voltage level from the sensor interface circuitry 44 and converts the analogue voltage level to digital form. The microprocessor 46 compares the digital form of voltage level to a threshold value and, if the digital form of voltage level exceeds the threshold value, the microprocessor actuates a loudspeaker (not shown in FIG. 2) and a Light Emitting Device (LED) (not shown in FIG. 2) to thereby provide an alarm.

Although not shown in FIG. 2, the leak sensor comprises an electric battery for providing electrical power to the electrical circuitry. Alternatively or in addition, the electrical circuitry is configured to extract electrical power from a WiFi signal received by the leak detector. Design of the electrical circuitry to extract electrical power from the WiFi signal is within the ordinary design capabilities of the person skilled in the art. The leak sensor and electrical circuitry yet further comprise a wireless transceiver 48. The wireless transceiver 48 is operative in accordance with a WiFi or Bluetooth standard. The microprocessor 46 is further operative upon the threshold value being exceeded to form a packet of alarm data and to convey the packet of alarm data from the leak detector by way of the wireless transceiver 48. Where the wireless transceiver 48 is operative in accordance with a Bluetooth standard, the packet of alarm data is conveyed to another leak detector located within wireless range in the same premises and then passed through further leak detectors within wireless range of each other until the data packet reaches a WiFi enabled leak detector. The WiFi enabled leak detector then passes the packet of alarm data to computing apparatus, such as a mobile device, which is operative to convey an alarm in the form of the like of an email or SMS to a user by way of a Wide Area Network (WAN) constituted by a GPRS or 4G network. In an alternative form, the leak detector represented in FIG. 2 is WiFi enabled and is therefore operative to convey the packet of alarm data directly to computing apparatus for onwards transmission. The design of electrical circuitry according to the first embodiment of electrical circuitry shown in FIG. 2 is within the scope of standard design procedure familiar to the person of ordinary skill in the art.

Figure 3:
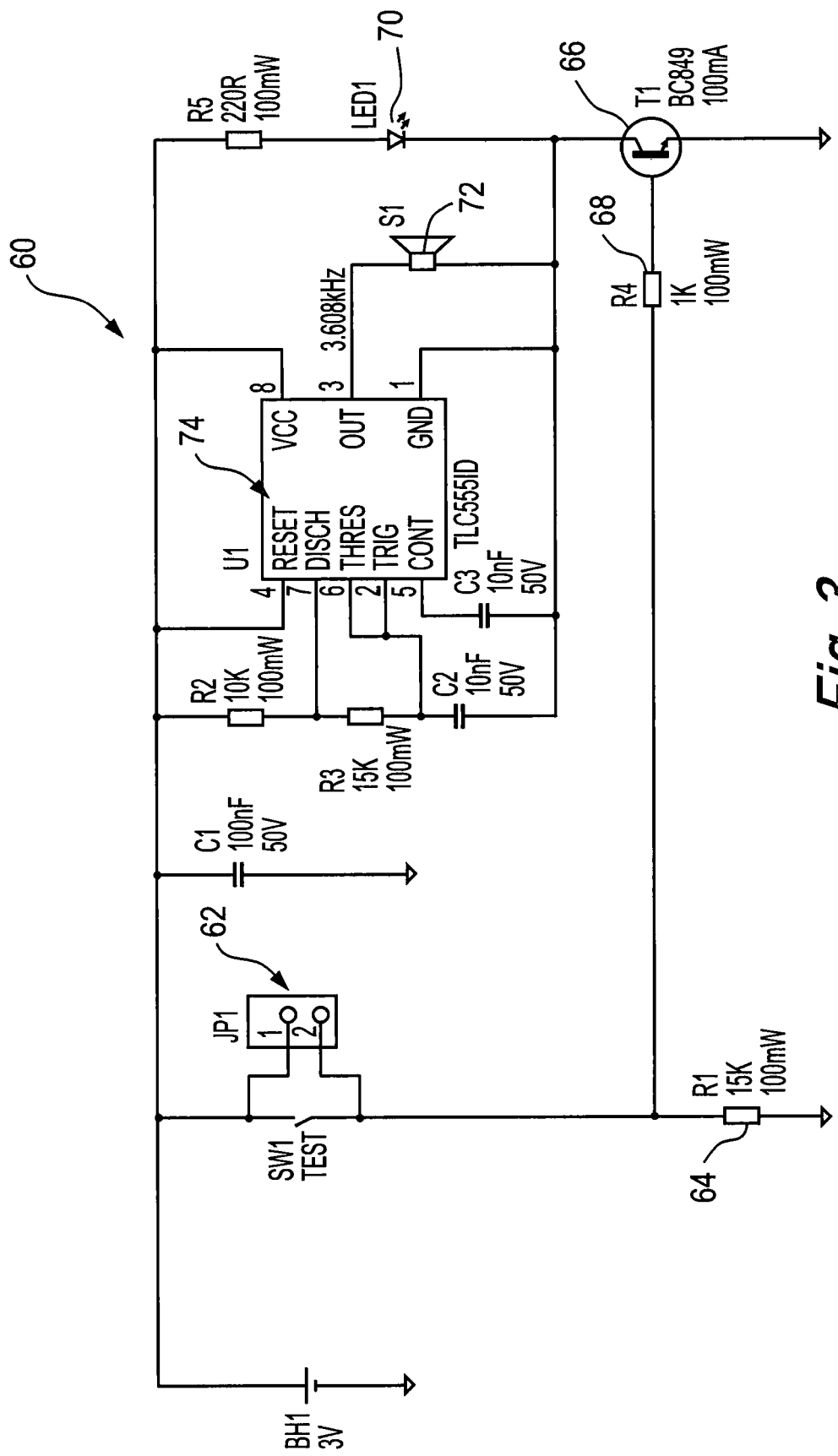
FIG. 3 is a circuit schematic of electrical circuitry according to a second embodiment.

FIG. 3 shows a circuit schematic of electrical circuitry 60 according to an embodiment differing from the embodiment represented in FIG. 2. The electrical circuitry 60 comprises a connector 62 to which the two spaced apart electrically conducting elements are electrically connected. The connector 62 is in series with a first resistor 64 whereby conduction between the two spaced apart electrically conducting elements causes current to flow through the first resistor 64 and for a potential to develop across the first resistor 64. The first resistor 64 is in parallel with the base and emitter of a bipolar junction transistor 66 with the base connection being by way of a second, bias resistor 68. The potential developed across the first resistor 64 is operative to switch on the bipolar junction transistor 66 whereby current flows in the collector circuit of the bipolar junction transistor. The collector circuit of the bipolar junction transistor comprises an light emitting diode (LED) 70 which is turned on by the collector current. The collector circuit also comprises a loudspeaker 72 and a timer circuit 74. The loudspeaker 72 and the timer circuit 74 are configured such that the loudspeaker 72 is operative upon flow of collector current when the bipolar junction transistor 66 is switched on to actuate the loudspeaker for a predetermined period of time set by the timer circuit.

Figure 4A:
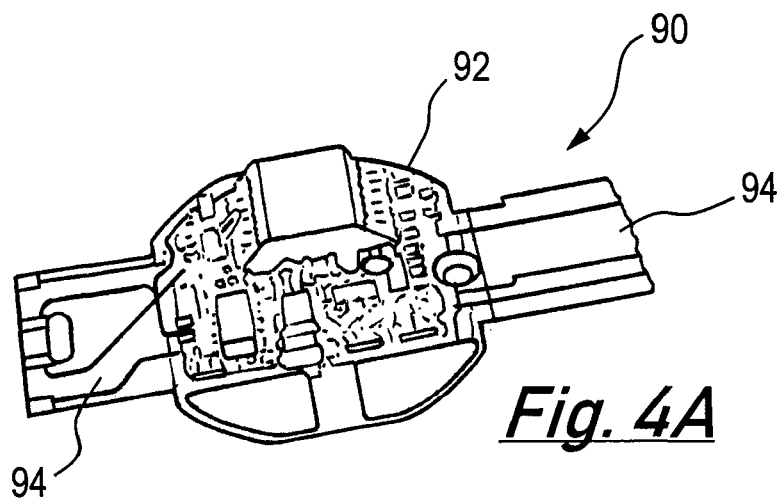
FIG. 4A is a perspective view of a leak detector according to a second embodiment.
Figure 4B:
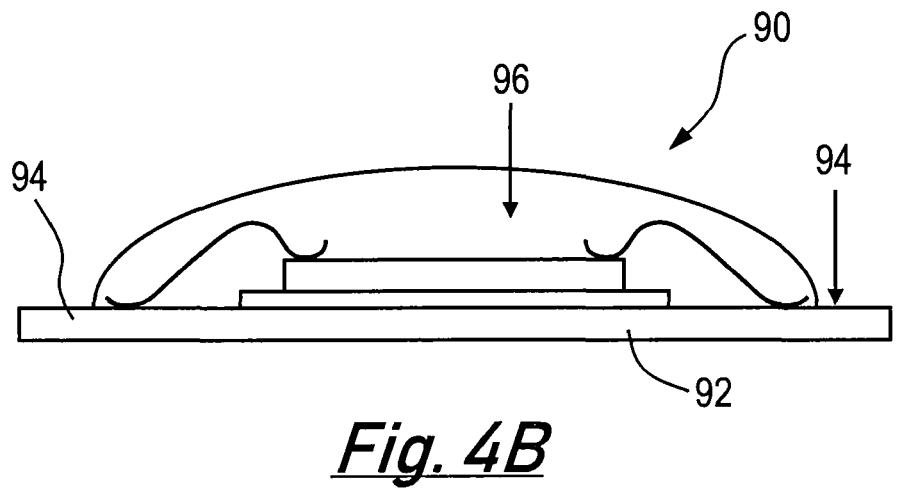
FIG. 4B is a side view of the leak detector according to the second embodiment.

A leak detector according to a second embodiment is shown in perspective view in FIG. 4A. This embodiment of leak detector 90 is of the same form and function as the leak detector 10 of FIGS. 1A and 1B except as will now be described. Instead of a PVC housing and fastener, this embodiment comprises a flexible printed circuit board (PCB) which is shaped to define a central area 92 of generally circular shape. Electrical circuitry of a form described above is mounted on the central area 92. The flexible PCB is further shaped such that each of two rectangular parts 94 extend from a respective side of the central area 92. Although not shown in FIG. 4A, a fastener of the form described above provides for attachment of the distal ends of the rectangular parts 94 to each other whereby the leak detector 90 of FIG. 4A is secured to a water pipe. The underside of each of the rectangular parts 94 has defined thereon two spaced apart electrical conductors which extend along the rectangular part 94 and which are electrically coupled to the electrical circuitry on the central area 92. Leaked water establishes a conductive path between the spaced apart electrical conductors whereby the electrical circuitry is operative to detect a leak as described above. As may be seen from the side view of this embodiment shown in FIG. 4B, the electrical circuitry is encapsulated with an epoxy 96, such as an epoxy of conventional form used in glob top encapsulation.

Figure 5:
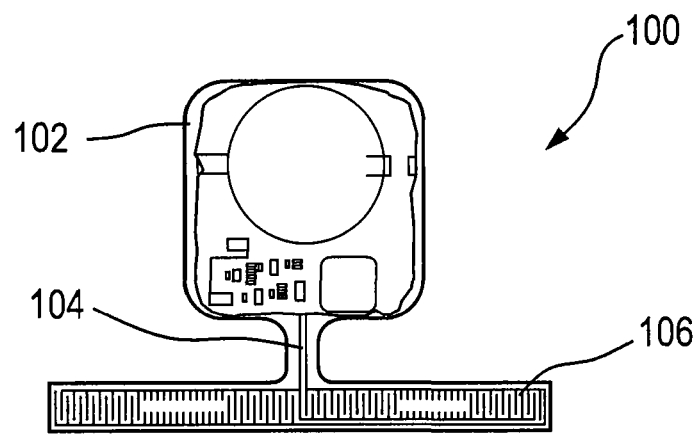
FIG. 5 is a plan view of a leak detector according to a third embodiment.

A plan view of a leak detector 100 according to a third embodiment is shown in FIG. 5. The leak detector 100 of FIG. 5 is of the same form and function as the leak detector 90 of FIGS. 4A and 4B except as will now be described. The flexible PCB defines a circuit area 102 on which the electrical circuitry is mounted. The electrical circuitry is encapsulated with an epoxy. Instead of parts of fastener extending from opposite sides of the central area 102, the flexible PCB of the present embodiment defines a neck 104 which extends from a side of the circuit area 102. The flexible PCB further defines an elongate, rectangular part 106 on the underside of which are formed spaced apart conductors. The spaced apart conductors in the rectangular part 106 are electrically coupled to the electrical circuitry on the circuit area 102 by way of electrical conductors in the neck 104. The neck 104 joins the rectangular part 106 half way along the rectangular part whereby the circuit area 102 and the rectangular part 106 are alongside each other. As described above, distal ends of the rectangular part 106 have a fastener of the form described above to provide for attachment of the leak detector 100 to a water pipe. In an alternative form, the underside of the rectangular part 106 has a film covered adhesive layer. When it is desired to attach the leak detector 100 to a water pipe, the film is removed from the adhesive layer to enable the adhesive layer to be brought into use in attaching the leak detector 100 to the water pipe. The leak detector 100 of FIG. 5 is operative in the same fashion as the leak detector 90 described above with reference to FIGS. 4A and 4B.

The invention claimed is:

1. A leak detector for detecting leaked liquid from a liquid containing pipe in a plumbing system, the leak detector comprising:
a flexible and elongate fastener configured to fit around the liquid containing pipe to thereby attach the leak detector to the liquid containing pipe;
electrical circuitry;
a housing containing the electrical circuitry; and
a leak sensor comprised in at least one of the fastener and the housing, the leak sensor sensing liquid leaking from the liquid containing pipe, the electrical circuitry detecting a leak in dependence on an output from the leak sensor, wherein
the leak detector is configured such that the housing and the fastener are side by side in a longitudinal direction of the fastener whereby the housing and the fastener are abreast;
the electrical circuitry is supported on a flexible printed circuit board and the housing is flexible, whereby the housing and the electrical circuitry therein fit closely around the liquid containing pipe;
the fastener is constituted by at least one part of the flexible printed circuit board; and
a liquid sensing part of the leak sensor comprises two spaced apart electrically conducting elements, the two spaced apart electrically conducting elements formed on the at least one part of the flexible printed circuit board constituting the fastener.

2. The leak detector according to claim 1, wherein a liquid sensing part of the leak sensor extends along the fastener.

3. The leak detector according to claim 2, wherein the two spaced apart electrically conducting elements extend along the fastener, electrical conduction between the two spaced apart electrically conducting elements in the presence of leaked liquid causing the electrical circuitry to detect a leak.

4. The leak detector according to claim 3, wherein each of the two spaced apart electrically conducting elements follows a tortuous path along the fastener.

5. The leak detector according to claim 1, wherein the housing is constituted by a mass of material disposed over the flexible printed circuit board, the mass of material encapsulating the electrical circuitry.

6. The leak detector according to claim 1, wherein the electrical circuitry is supported on a first part of the flexible printed circuit board, the fastener is constituted by a second part of the flexible printed circuit board, the first part being disposed to a side of the second part in a direction orthogonal to a longitudinal direction of the fastener whereby the electrical circuitry is alongside the fastener.

7. The leak detector according to claim 6, wherein the first and second parts of the flexible printed circuit board are joined by a bridging portion, the bridging portion being constituted by the flexible printed circuit board.

8. The leak detector according to claim 1, wherein the electrical circuitry is configured to transmit a leak detected signal to a remote location, transmission of a leak detected signal comprising at least one of an email and a Short Message Service (SMS) message.

9. The leak detector according to claim 1, wherein the leak detector is of a size and weight that it is readily gripped in and moved by one hand.

10. The leak detector according to claim 1, wherein the leak detector comprises a wireless transceiver, the leak detector comprising electrical circuitry configured to extract electrical power from a wireless signal received by the wireless transceiver.

11. The leak detector according to claim 1, wherein the fastener comprises a retaining arrangement which is configured to hold spaced apart locations on the fastener together whereby the leak detector is held in place around a pipe.

12. The leak detector according to claim 1, wherein the liquid containing pipe is a pipe for supplying or draining water in the plumbing system.

* * * * *